United States Patent
Grane et al.

[15] 3,665,048
[45] May 23, 1972

[54] PROCESS TO PRODUCE HIGH PURITY ISOBUTYLENE

[72] Inventors: Henry R. Grane; Isadore Edward Katz, both of Springfield, Pa.

[73] Assignee: Atlantic Richfield Company, New York, N.Y.

[22] Filed: Jan. 14, 1970

[21] Appl. No.: 2,773

[52] U.S. Cl.............................................260/682
[51] Int. Cl..........................................C07c 1/20
[58] Field of Search................................260/682

[56] References Cited

UNITED STATES PATENTS 2,636,057   4/1953   Cutcher et al. ..................260/682

Primary Examiner—Delbert E. Gantz
Assistant Examiner—G. E. Schmitkons
Attorney—Robert R. Cochran and Charles R. Wetter

[57] ABSTRACT

Essentially pure isobutylene is obtained by the controlled dehydration of a feed stream containing tertiary butyl alcohol and only traces of butenes. Dehydration takes place over an aluminum oxide catalyst wherein the reaction zone is maintained between 400° and 800° F. and preferably between 97.5 and 99.5 percent of the alcohol is converted primarily to isobutylene and water. A process is included for separation of the isobutylene from the unreacted alcohol, the water, and other constituents of the reactor effluent making possible the production of 99.9 percent pure stream of isobutylene. Higher tertiary alcohols can be dehydrated by essentially the same process.

10 Claims, 2 Drawing Figures

Patented May 23, 1972

INVENTORS
H. R. GRANE and
I. E. KATZ
BY Robert R. Cochran
ATTORNEY

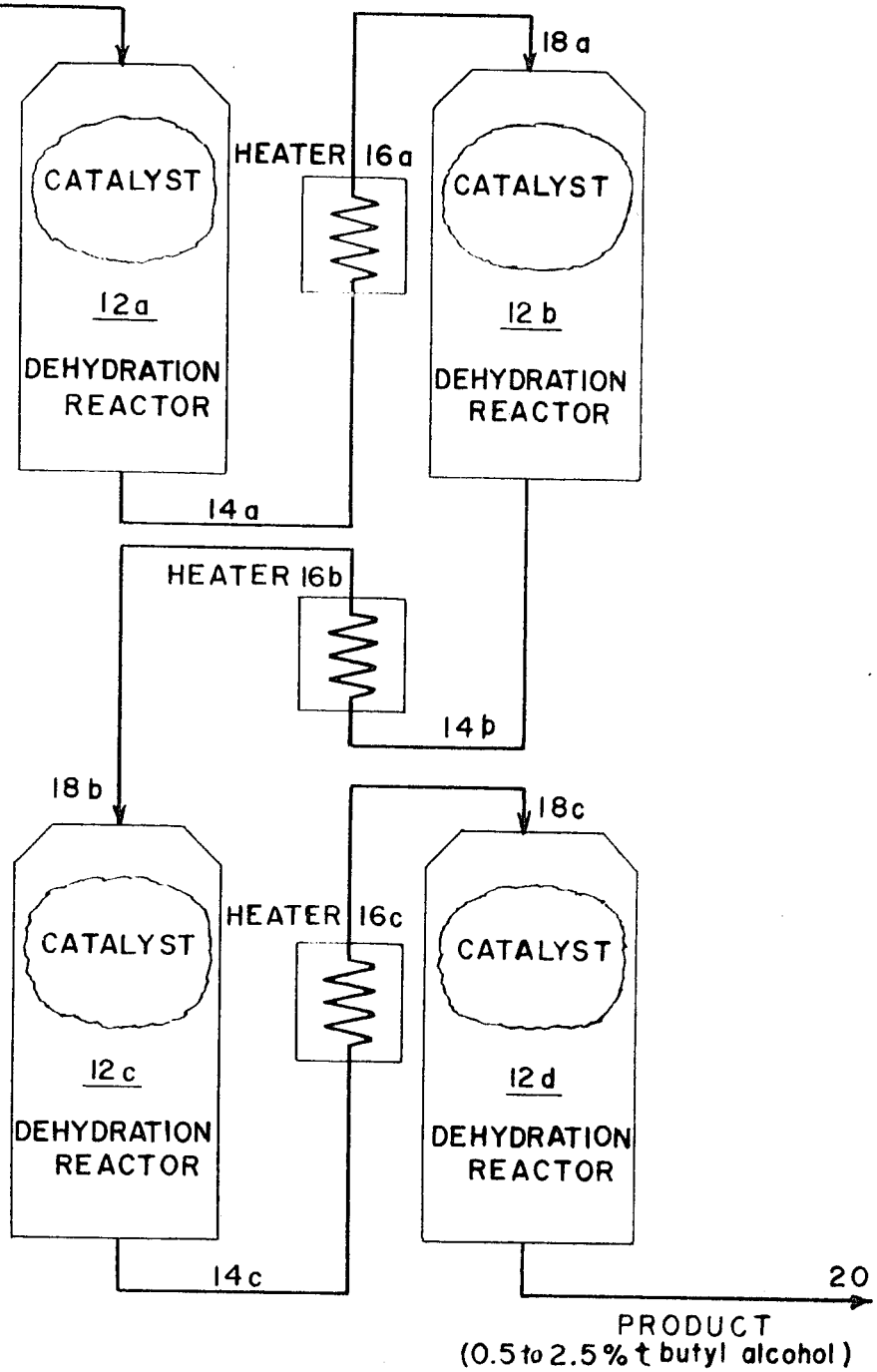

PROCESS TO PRODUCE HIGH PURITY ISOBUTYLENE

SUMMARY OF THE INVENTION

This invention relates to a process for preparing essentially pure alkenes from tertiary alcohols. More specifically, it involves a process for preparing essentially pure isobutylene by controlled dehydration of a tertiary butyl alcohol stream in the presence of an alumina catalyst. More particularly, this invention relates to the production of isobutylene by controlled dehydration of a tertiary butyl alcohol stream containing only traces of $C_4$ hydrocarbons, and a separation process for the effluent whereby a stream containing 99.9 percent isobutylene and less than 200 ppm of other $C_4$s can be obtained.

BACKGROUND OF THE INVENTION

Pure isobutylene is in demand for the preparation of butyl rubber and liquid polyisobutylenes which are widely used in the manufacture of lubricant additives and also as a starting material for isoprene manufacture by a series of reactions involving condensation of formaldehyde and isobutylene to yield a dioxane which is decomposed to form isoprene.

Many procedures are presently practiced for the manufacture of isobutylene. One of these is the treatment of a $C_4$ refinery stream comprising n-butane, isobutane, n-butenes, and isobutylene with concentrated cold sulfuric acid which preferentially extracts isobutylene. This has the disadvantage that the isobutylene extract contains as impurities some of the n-butenes and butadiene. Isobutylene has also been prepared by catalytic decomposition of t-butyl esters.

Probably the most widespread procedure for producing isobutylene has been the dehydration of alcohols. The art teaches that this has been done at various temperatures ranging from about 350° to 850° F. in the presence of various catalysts including oxides of aluminum and thorium, acid impregnated materials, and siliceous material such as silica gel, kaolin, and acid treated clays. These solid catalysts which operate in heterogeneous systems are of the pre-formed or pilled type. Such catalysts must be regenerated periodically to remove carbonaceous deposits formed on them during the process. Concentrated acids have been used for the dehydration with their attendant disadvantages, such as varying degrees of polymerization of the olefinic product accompanying the reaction. Aqueous solutions of acid acting substances have also been used. Prior art dehydration of alcohol processes teach that in addition to the corresponding alkene, isomers and polymers of the desired product are present which simultaneously reduce the yield of the desired product and create many insurmountable problems in separation of the product from the reactor effluent stream.

It is an object of the present invention to develop a process whereby high conversion of an alcohol to its corresponding alkene can be obtained.

Further it is an object of the present invention to control the degree of dehydration of an alcohol in order to obtain a product stream containing high purity alkene with respect to other constituents in the product stream containing the same number of carbon atoms.

Another object is to develop a process for the production and separation of high purity isobutylene from a feed containing at least 88 percent tertiary butyl alcohol.

A still further object of the present invention is to develop a process whereby a tertiary butyl alcohol stream can be dehydrated to convert 97.5 to 99.5 percent of the alcohol to water and isobutylene wherein said effluent contains at least 99.9 percent isobutylene with respect to other $C_4$ hydrocarbons.

Broadly, our invention resides in a process for the production of essentially pure isoalkenes which comprises chemically dehydrating a tertiary alcohol, having the general formula

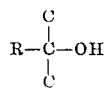

wherein R is an alkyl radical containing one to three carbon atoms, in the vapor phase, said stream containing at least 85 percent tertiary alcohol and less than 100 ppm of olefin impurities having the same number of carbon atoms as the alcohol, in the presence of an activated alumina catalyst, maintaining the reaction temperature within the dehydration zone between 400° and 800° F. while controlling the pressure and flow rate through said reaction zone to cause the conversion of the tertiary alcohol to be at least 90 percent but nor more than 99.5 percent in order to produce a reactor effluent containing at least 99.9 percent of the corresponding alkenes with respect to other hydrocarbons having the same number of carbon atoms.

In a more specific aspect, our invention comprises a process for the production of isobutylene from a feed stock containing at least 85 percent tertiary butyl alcohol and less than 100 ppm butanes comprising the steps of;

vaporizing the feed stock, passing the feedstock into a dehydration zone containing an activated alumina catalyst, said zone being maintained between 400° and 800° F., dehydrating at least 90 percent but not more than 99.5 percent of the tertiary butyl alcohol, passing the effluent from the dehydration zone into a scrubbing zone, introducing a water-caustic scrubbing solution into an intermediate portion of said scrubbing zone, removing a bottom stream from the scrubber containing water, caustic, and organic impurities, removing an overhead stream containing water and crude isobutylene;

passing said overhead stream to a condenser, removing separated water from the lower portion of said condenser, passing the saturated isobutylene stream recovered overhead from said condenser into a distillation zone, removing an overhead stream from the distillation zone containing water, $C_3$s and other light impurities, removing a bottom stream from the distillation zone containing isobutylene and heavy impurities, passing the bottom stream into a rerun distillation zone, removing a bottom stream from the rerun distillation zone containing materials higher boiling than said isobutylene, removing an overhead stream from the rerun distillation zone consisting essentially of isobutylene.

For convenience, most of the following discussion is directed to the treatment of tertiary butyl alcohol but those skilled in the art will recognize that our method is broadly applicable to higher tertiary alcohols such as, for example tertiary amyl alcohol (2-methylbutanol-2), 2-methylpentanol-2, 2,3-dimethylbutanol-2, and the like.

The primary reaction which takes place in the dehydration of an alcohol is the conversion of the alcohol to its corresponding alkene and water. This is a highly endothermic reaction and we have found that the reaction can be controlled if the heat is applied at a plurality of places within the reaction zone. It is known that temperatures above 800° F. are conducive to increased coking and plugging of the catalyst bed thereby reducing the effectiveness of the catalyst and requiring frequent catalyst exchange or rejuvenation. Additionally, at temperatures below 400° F. the reaction proceeds at a very slow rate which is not acceptable for large scale production of isobutylene.

In accordance with this invention we have found it possible to convert up to but not more than 99.5 percent of the feed alcohol to its respective alkene and water with only negligible side reactions.

Table 1 gives the results of an analysis of reactor effluent of tertiary butyl alcohol dehydration at 80 psig using an Alcoa F-1 activated alumina catalyst at various degrees of dehydration of the alcohol.

TABLE 1

| % alcohol converted | 90 | 98 | 99 | 99.5 | 99.9 | 99.99 |
|---|---|---|---|---|---|---|
| ppm n-butenes by weight | 60 | 125 | 160 | 200 | 400 | 2000 |

The ppm of n-butenes found in the effluent comparatively slowly increases up to about 99.5 percent conversion of the alcohol. Above that level of conversion the presence of n-butenes increases at a rapid rate. Lesser degrees of conversion of the alcohol can be obtained by increasing flow rate or reducing temperature, however, if overall reaction limitations are followed, equally pure isobutylene can be obtained. Economically it is desirable to convert as much of the feed stock as is practical to obtain high yield of the desired high purity isobutylene. We generally convert at least 95 percent of the alcohol and prefer to convert between 97.5 percent and 99.5 percent of the alcohol to the corresponding alkene and water.

For a better understanding of the present invention a discussion of the various process steps will be given in conjunction with the figures.

FIG. 2 is a preferred reactor arrangement.

Figure 1:
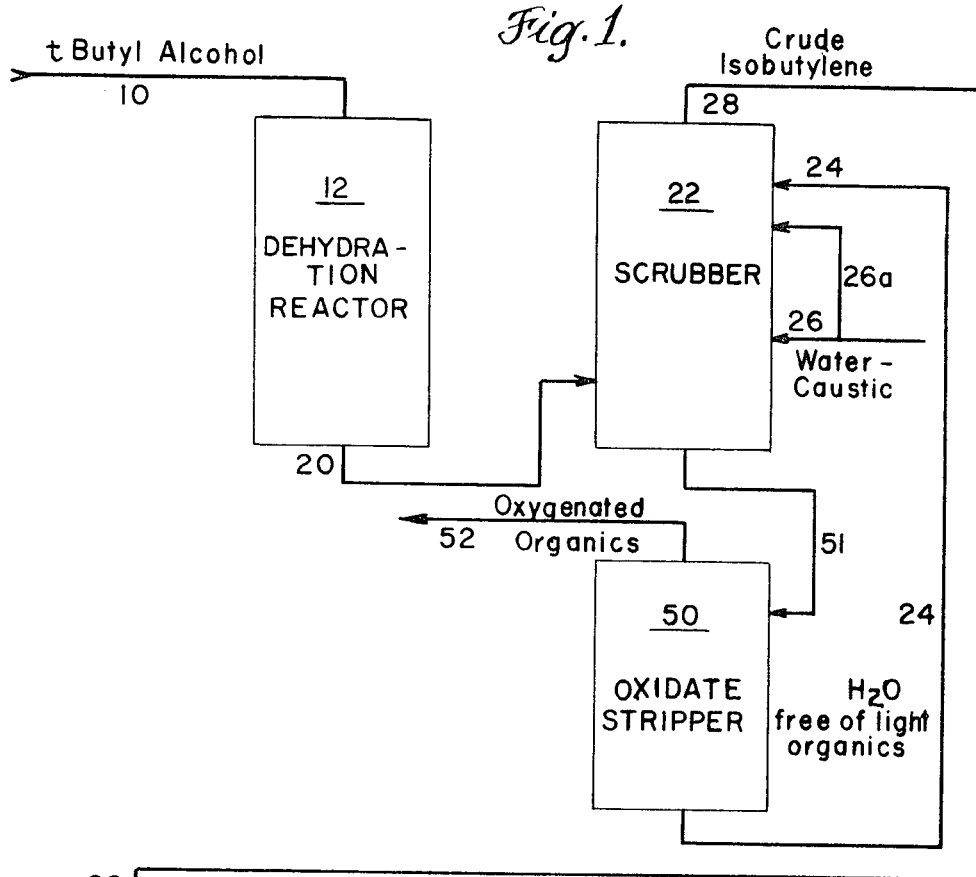
FIG. 1 is a flow diagram of the process including the optional oxidate stripper.
Figure 1:
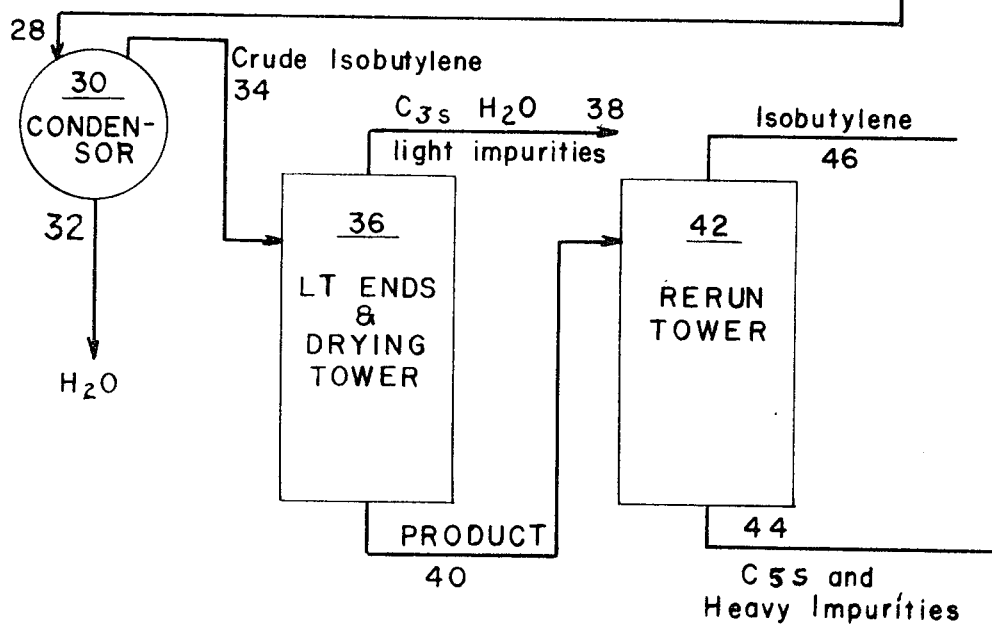

In FIG. 1 a feed stream 10 containing tertiary butyl alcohol at temperatures between 650° and 800° F. and preferably between 700° and 750° F. is introduced into a dehydration reactor 12 under controlled conditions whereby at least 97.5 and not more than 99.5 percent of the alcohol is converted to isobutylene and water. The feed stream may contain impurities such as acetone, water, peroxides and hydrocarbons but only traces of butanes or butenes and generally, at least 85 percent tertiary butyl alcohol. The dehydration reaction catalyst is a porous form of aluminum oxide of high surface area such as Alcoa's F-1 Activated Alumina. Other suitable catalysts can be found in Alcoa's publication, *Products Data*, Section GB2A, entitled "Activated and Catalytic Aluminas", of Feb. 1, 1963. The quantity of catalyst required is related to the temperature and feed rates at which the reaction occurs. Normally between 0.5 and 10 parts by weight of alcohol are fed per hour per part by weight of catalyst. Preferably the feed rate is such that 2 to 4 parts by weight of alcohol per hour are introduced to the reactor per part by weight of catalyst. The reaction which takes place is highly endothermic and consequently, it is preferable to use multiple reactors in series or heated reaction tubes in order to control the temperature range during reaction. Temperature within the reactor should be maintained between 475° and 775° F. We prefer to maintain reaction temperature between 525° and 725° F. The pressure at which the reaction takes place is not critical and we obtain satisfactory results in the range between atmospheric pressure and 300 psig. For ease in downstream separation of the isobutylene from other reaction products we prefer to operate the reactor with an inlet pressure of about 100 to 250 psig.

The effluent from the reactor passes through line 20 into a caustic-water scrubber 22 wherein the acidic components are removed by action of the caustic. The oxygenated organic impurities in the reactor effluent are reduced by scrubbing with water that is essentially free of light organics. The water is introduced into the upper region of the scrubber through line 24. The caustic solution is primarily introduced into the scrubber through line 26 into the lower region of the scrubber but above the effluent inlet while about 10 percent passes through line 26a and is injected in the upper region. Crude isobutylene and water is taken from the top of the scrubber through line 28 and passed into a condenser 30. Excess water is removed through line 32 and the saturated isobutylene passes through line 34 into a light ends and drying tower, 36. $C_3$s, water and light impurities are distilled off through line 38 and the product stream is removed from the bottom of the tower through line 40 and passed into a rerun tower 42. $C_5$s and other heavy impurities are fractionated to the bottom of the rerun tower 42 and are taken off through line 44 while essentially pure isobutylene is removed through line 46 at the top of the rerun tower.

An oxidate stripper 50 can be used to remove the oxygenated organic impurities from the bottom of scrubber 22 rather than discarding such material. The material removed from the bottom of the scrubber 22 passes through line 51 into the stripper 50. The oxygenated organic materials are removed overhead through line 52 and the stripped water may be recycled through line 24 to the upper region of the scrubber for reuse.

In the preferred reactor system of FIG. 2 can be seen a series of four dehydration reactors 12a, 12b, 12c, and 12d, connected in series and containing no valves between the discharge of one reactor and the inlet of the next reactor. Between the reactors are heaters 16a, 16b, 16c. Dehydration of the alcohol takes place in stages whereby the effluent from reactor 12a passes through conduit 14a where it is reheated in heater 16a before being introduced into reactor 12b. This procedure is repeated through the four reactors and until the effluent contains preferably less than 2.5 percent but at least 0.5 percent unreacted alcohol. Separation of the isobutylene is accomplished by the process discussed in conjunction with FIG. 1.

The figures and the above discussion are exemplary of the major process equipment necessary for producing isobutylene using the present disclosure. There would be many valves and heat exchangers that would necessarily be placed into the process to increase efficiency of the overall operation. However, these are within the purview of those skilled in the art.

In order to put the above principles into practice, a plant was designed to produce isobutylene from a feed stock having the following general composition;

| Component | Wt. Percent |
|---|---|
| Tertiary butyl alcohol | 95–97% |
| Acetone | 0.5–1.5% |
| Water | 0.5–3.0% |
| Other $C_4$ hydrocarbons | 100 ppm |
| Other hydrocarbons and traces of other oxygenated components make up the balance of the feed. | |

The feed is introduced into the first reactor at 700° F. and at a pressure of 220 psig. Outlet temperature of the first reactor is 520° F. The effluent is reheated to 700° F. and passed into the second reactor for further dehydration. The effluent leaves this reactor at 520° F., is reheated to 700° F. and passed into the third reactor for further dehydration. The effluent exits the reactor at 550° F. and is reheated to 700° F. for further dehydration in the fourth reactor. The pressure at the outlet of the last reactor is 100 psig at 620° F. The flow rate of the feed through the reactor is adjusted so that 98 percent of the tertiary butyl alcohol is converted to isobutylene and water.

The reactor effluent is then passed into a water - caustic scrubber that utilizes 20 percent sodium hydroxide solution and stripped condensate water to neutralize acidic components and reduce oxygenated organics respectively. The scrubber consists of a column containing 34 trays having a top pressure of about 90 psia. The top temperature is maintained at 5° F. above the condensing temperature of isobutylene (130° F.). The column bottom temperature is 180° F. Ten percent of the caustic is introduced at the fourth tray from the bottom. The water used in the scrubber has a low concentration of light organics.

The product stream is taken from the top of the scrubber and passed into a condenser under a pressure of 85 psia at 115° F. wherein about 97 percent of the isobutylene is condensed. Water in excess of saturation is removed. The water-saturated isobutylene is then passed into the light ends and drying tower.

The light ends tower pressure is maintained at 140 psia with a top temperature of about 145° F. and a bottom temperature of 156° F. The overhead cut rejects about 1.4 percent of the isobutylene. The water is removed at the top with the low molecular weight hydrocarbons because water behaves non-ideally having a volatility relative to isobutylene of about 6 in this system.

The product stream is removed from the bottom of the light ends tower and introduced into the upper section of a rerun tower to remove $C_5$s and heavier contaminants from the product stream. The column top pressure is maintained at 100 psia and the top temperature is 133° F. The bottom temperature is set by $C_4$ recovery to limit losses at 0.75 percent isobutylene and the temperature is 156° F. Plant design is based on obtaining a product stream from the top of the rerun tower that is at least 99 percent isobutylene and less than 300 ppm of other $C_4$s.

EXAMPLE 1

Based on the plant design discussed above an actual plant has been built and is in operation. A typical feed used in the plant contained 97.3 weight percent tertiary butyl alcohol, 1 weight percent water, 1.1 weight percent acetone, the balance of the feed consisted of esters and other oxygenated hydrocarbons with only traces of any $C_4$ hydrocarbons. The feed was introduced into the first reactor at 708° F. at 132 psig. The effluent exited this reactor at 541° F. and was reheated to 677° F. prior to introduction to the second reactor. The effluent exited this reactor at 555° F. and was reheated to 707° F. for introduction into the third reactor. Exit temperature was 574° F. and the effluent was reheated to 687° F. for introduction into the fourth reactor. Exit temperature from the final reactor in the series was 614° F. at 95 psig. Alcoa F–1 activated alumina was placed in each of the reactors such that 3 parts by weight of feed per hour passed through the reactor per part by weight of catalyst present. Analysis of the exit gas indicated that 2 percent of the initial tertiary butyl alcohol was present therefor the design 98 percent conversion was obtained. The separation of the isobutylene from other constituents, including the water and unreacted tertiary butyl alcohol took place under conditions approximating those given in the plant design above and the product stream analysis was at least 99.97 weight percent isobutylene and less than 200 ppm by weight were other $C_4$s.

EXAMPLE 2

Using pure tertiary butyl alcohol under equivalent reaction conditions as given in Example 1, the same $C_4$ hydrocarbon purity was obtained.

EXAMPLE 3

Using tertiary butyl alcohol containing 6 weight percent acetone and 3.3 weight percent water, 88 percent tertiary butyl alcohol, and other impurities under equivalent reaction conditions to those of Example 1 the same $C_4$ hydrocarbon purity was obtained.

EXAMPLE 4

When the feed stream contained 2 weight percent peroxides there was a marked increase in $C_1$, $C_2$, and $C_3$ impurities in the reactor effluent; obviously derived from decomposition of the peroxides. Percent conversion of the alcohol did not influence the level of these impurities while there was no evidence of peroxide in the effluent. An isobutylene stream was obtained containing less than 1,000 ppm of other $C_4$ constituents using equivalent reaction conditions as in Example 1.

EXAMPLE 5

Using a feed stream containing a high concentration of tertiary amyl alcohol in the process of Example 1, one obtains an equally high yield of a mixture of the corresponding alkenes, 2-methylbutene-1 and 2-methylbutene-2.

WE CLAIM:

1. A process for the production of essentially pure isoalkenes which comprises chemically dehydrating a tertiary alcohol, having the general formula

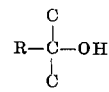

wherein R is an alkyl radical containing one to three carbon atoms, in the vapor phase, said stream containing at least 85 percent tertiary alcohol and less than 100 ppm of olefin impurities having the same number of carbon atoms as the alcohol, in the presence of an activated alumina catalyst, maintaining the reaction temperature within the dehydration zone between 400° and 800° F. while controlling the pressure and flow rate through said reaction zone to cause the conversion of the tertiary alcohol to be at least 90 percent but not more than 99.5 percent in order to produce a reactor effluent containing at least 99.9 percent of the corresponding alkenes with respect to other hydrocarbons having the same number of carbon atoms.

2. The process of claim 1 wherein at least 95 percent of the alcohol is converted to its alkene.

3. The process of claim 1 wherein the alcohol is tertiary butyl alcohol.

4. The process of claim 1 wherein the alcohol is tertiary butyl alcohol and at least 97.5 percent but not more than 99.5 percent of the alcohol is converted to isobutylene.

5. The process of claim 1 wherein the dehydration is carried out in a series of adiabatic reactors with reheaters so located as to maintain the feed to each reactor between 650° and 750° F. and wherein the flow rate is adjusted to maintain the exit temperature of each reactor between 500° and 650° F. so that at least 95 percent of the tertiary alcohol is converted.

6. The process of claim 5 wherein the alcohol is tertiary butyl alcohol.

7. The process of claim 5 wherein the alcohol is tertiary butyl alcohol and at least 97.5 percent but not more than 99.5 percent of the alcohol is converted to isobutylene.

8. A process for the production of isobutylene from a feed stock containing at least 85 percent tertiary butyl alcohol and less than 100 ppm butanes comprising the steps of;
vaporizing the feed stock,
passing the feedstock into a dehydration zone containing an activated alumina catalyst, said zone being maintained between 400° and 800° F.,
dehydrating at least 90 percent but not more than 99.5 percent of the tertiary butyl alcohol,
passing the effluent from the dehydration zone into a scrubbing zone,
introducing a water-caustic scrubbing solution into an intermediate portion of said scrubbing zone,
removing a bottom stream from the scrubber containing water, caustic and organic impurities,
removing an overhead stream containing water and crude isobutylene,
passing said overhead stream to a condenser,
removing separated water from the lower portion of said condenser,
passing the saturated isobutylene stream recovered overhead from said condenser into a distillation zone,
removing an overhead stream from the distillation zone containing water, $C_3$s, and other light impurities,
removing a bottom stream from the distillation zone containing isobutylene and heavy impurities, passing the bottom stream into a rerun distillation zone,
removing a bottom stream from the rerun distillation zone containing materials higher boiling than said isobutylene,
removing an overhead stream from the rerun distillation zone consisting essentially of isobutylene.

9. The process of claim 8 wherein the dehydration zone comprises four adiabatic reactors in series and the reaction temperature is maintained between 500° and 750° F. by heating the reaction mixture between each reactor.

10. The process of claim 9 wherein the dehydration continues until at least 97.5 percent of the tertiary butyl alcohol is converted to isobutylene and water.

* * * * *